United States Patent
VanRiper et al.

(10) Patent No.: US 7,461,289 B2
(45) Date of Patent: Dec. 2, 2008

(54) SYSTEM AND METHOD FOR COMPUTER SERVICE SECURITY

(75) Inventors: Ryan A. VanRiper, Maple Grove, MN (US); David Musliner, Plymouth, MN (US); Walter L. Heimerdinger, Minneapolis, MN (US); Michael Pelican, Purcellville, VA (US)

(73) Assignee: Honeywell International Inc., Morristown, NJ (US)

( * ) Notice: Subject to any disclaimer, the term of this patent is extended or adjusted under 35 U.S.C. 154(b) by 449 days.

(21) Appl. No.: 11/377,740

(22) Filed: Mar. 16, 2006

(65) Prior Publication Data

US 2007/0220135 A1    Sep. 20, 2007

(51) Int. Cl.
*G06F 11/00*    (2006.01)

(52) U.S. Cl. .............................. 714/4; 714/3

(58) Field of Classification Search ............. 714/3, 714/4, 7
See application file for complete search history.

(56) References Cited

U.S. PATENT DOCUMENTS

| | | | | |
|---|---|---|---|---|
| 6,014,686 | A * | 1/2000 | Elnozahy et al. | 709/202 |
| 6,609,213 | B1 * | 8/2003 | Nguyen et al. | 714/4 |
| 6,754,546 | B1 * | 6/2004 | Hindus et al. | 700/94 |
| 6,823,355 | B1 * | 11/2004 | Novaes et al. | 709/201 |
| 6,985,937 | B1 * | 1/2006 | Keshav et al. | 709/223 |
| 7,165,097 | B1 * | 1/2007 | Mackin et al. | 709/218 |
| 7,328,367 | B2 * | 2/2008 | Ukai et al. | 714/7 |
| 7,330,996 | B2 * | 2/2008 | Coteus et al. | 714/3 |
| 7,383,463 | B2 * | 6/2008 | Hayden et al. | 714/4 |
| 2003/0005350 | A1 * | 1/2003 | Koning et al. | 714/4 |
| 2003/0014526 | A1 * | 1/2003 | Pullara et al. | 709/227 |
| 2003/0018813 | A1 * | 1/2003 | Antes et al. | 709/245 |
| 2003/0229817 | A1 * | 12/2003 | Colasurdo et al. | 714/4 |
| 2005/0044301 | A1 * | 2/2005 | Vasilevsky et al. | 711/1 |
| 2005/0064884 | A1 * | 3/2005 | Dumont et al. | 455/466 |
| 2005/0108407 | A1 * | 5/2005 | Johnson et al. | 709/228 |
| 2005/0120160 | A1 * | 6/2005 | Plouffe et al. | 711/1 |
| 2005/0159927 | A1 * | 7/2005 | Cruz et al. | 702/188 |
| 2006/0010176 | A1 * | 1/2006 | Armington | 707/204 |
| 2006/0050629 | A1 * | 3/2006 | Saika | 370/216 |
| 2006/0155708 | A1 * | 7/2006 | Brown et al. | 707/10 |
| 2006/0184349 | A1 * | 8/2006 | Goud et al. | 703/24 |
| 2006/0184653 | A1 * | 8/2006 | van Riel | 709/222 |
| 2006/0230103 | A1 * | 10/2006 | Takamoto et al. | 709/203 |
| 2007/0078982 | A1 * | 4/2007 | Aidun et al. | 709/225 |
| 2007/0136554 | A1 * | 6/2007 | Biran et al. | 711/203 |
| 2007/0198710 | A1 * | 8/2007 | Gopalakrishnan | 709/225 |

* cited by examiner

*Primary Examiner*—Scott T. Baderman
*Assistant Examiner*—Paul F. Contino
(74) *Attorney, Agent, or Firm*—Kris T. Fredrick

(57) ABSTRACT

In an embodiment, a computer-based service security system receives a communication such as a query. The system processes that query in a server, which may be referred to as a lead server, and creates a plurality of copies of that lead server. The query is transferred to the plurality of copies of the lead server when the query did not cause a problem in the lead server. The query is transferred to a learning server when the query caused a problem in the lead server. The lead server is replaced by one of the copies of the lead server when the query caused a problem on the lead server.

20 Claims, 3 Drawing Sheets

SYSTEM AND METHOD FOR COMPUTER SERVICE SECURITY

This invention was made with Government support under Contract FA8750-04-C-0253 awarded by the Air Force. The Government has certain rights in this invention.

TECHNICAL FIELD

Various embodiments relate to computer based service security, and in an embodiment, but not by way of limitation, to the prevention of problems caused by corrupt data and/or queries.

BACKGROUND

While much attention is paid to breaches of computer and network systems in both the lay and technical press, such breaches of security are not altogether new, and indeed have been around since the inception of computer networks. To counter such security breaches, many systems, especially on the server side, install firewalls to prevent harmful content from entering the system. While helpful, such firewalls and related software and tools consume precious resources on the server side, and lack the ability to evolve and learn from attacks on the system.

The art is therefore in need of a different approach for protecting the integrity of computer applications.

SUMMARY

In an embodiment, a computer-based application system receives a communication such as a query. The system processes that query in a server, which may be referred to as a lead server, and creates a plurality of copies of that lead server. The query is transferred to the plurality of copies of the lead server when the query does not cause a problem in the lead server. The query is transferred to a learning server when the query causes a problem in the lead server and the lead server is replaced by one of the copies of the lead server.

DETAILED DESCRIPTION

Figure 1:
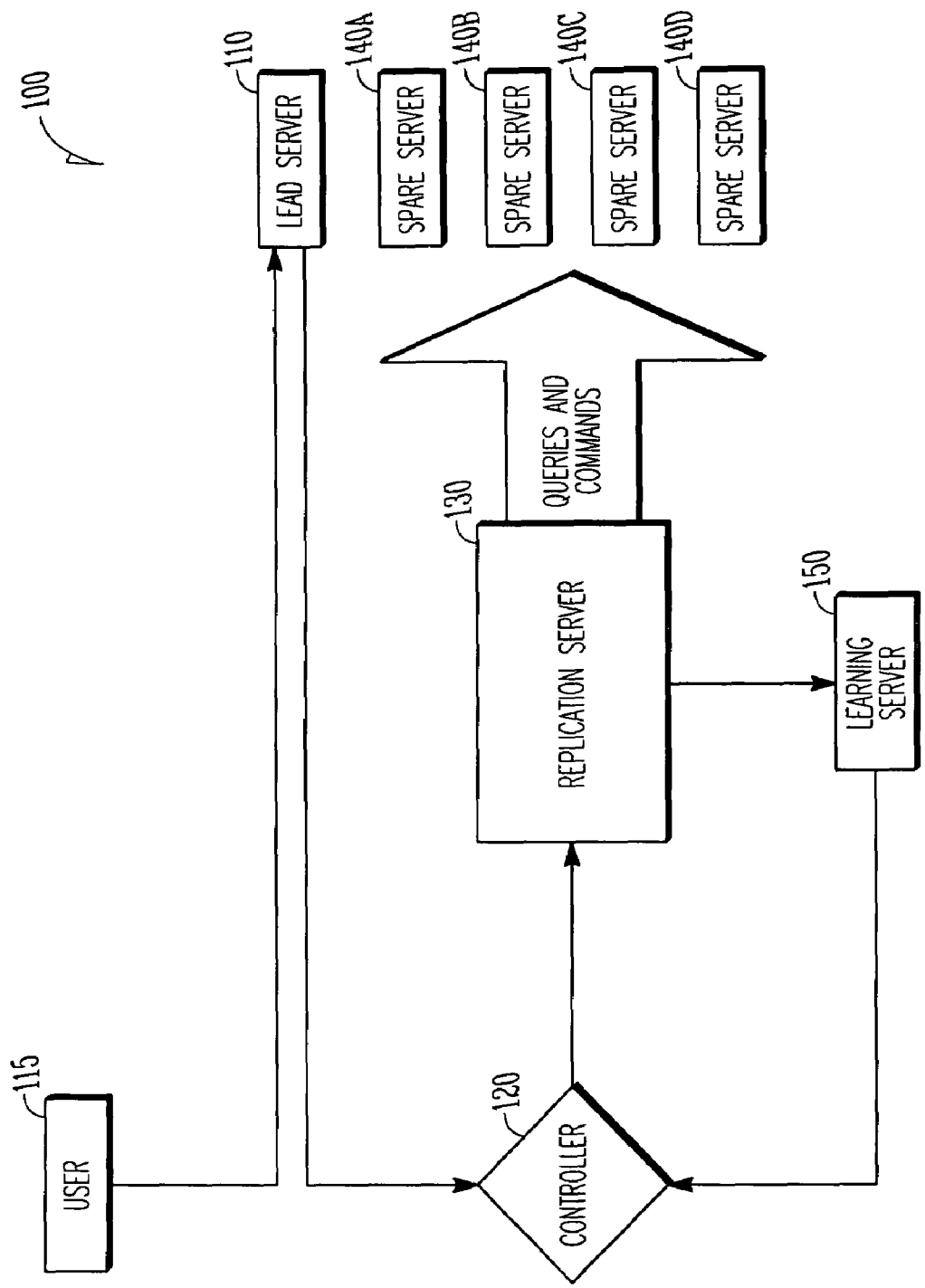
FIG. 1 illustrates an example embodiment of a computer based service security system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for an architecture for a computer based security system, in accordance with embodiments of the invention. A number of figures show flow diagrams illustrating operations for an architecture for a computer based security system. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 illustrates an example embodiment of a computer based system 100 that detects and responds to corrupt data, communications, and/or queries or other computer based attacks. Referring to FIG. 1, a lead server 110 may be accessed by one or more users 115. The server 110 is connected to a controller module 120, and the controller module 120 is connected to a replication server 130. The replication server 130 is connected to one or more spare servers 140A, 140B, 140C, and 140D, and a learning server 150. While four spare servers are illustrated in FIG. 1, it should be understood that any number of spare servers may be implemented.

The replication server 130 functions as a proxy server for any protected service (i.e., server) and provides an easy means of controlling the service. In an embodiment, the replication server 130 is modular and adaptable to any internet service. It provides an easy means of controlling services or issuing protocol specific commands. The replication server 130 may create, delete, monitor, and send queries to servers. In an embodiment, the servers may be MySQL servers.

Additionally, the replication server 130 has the ability to link with any provided library which exposes an API (Application Programmers Interface) and provides hooks to the service(s) to be protected. Services that the replication server 130 could protect include Email, DNS, Web, or Databases. The replication server 130 can also issue commands that are specific to the operating system to execute functions such as creating new databases, copying data, adding users, removing users, and changing network settings. The system 100 may include several scripts that aid the ability to create servers, bring down servers, add database users, and set passwords.

Figure 2:
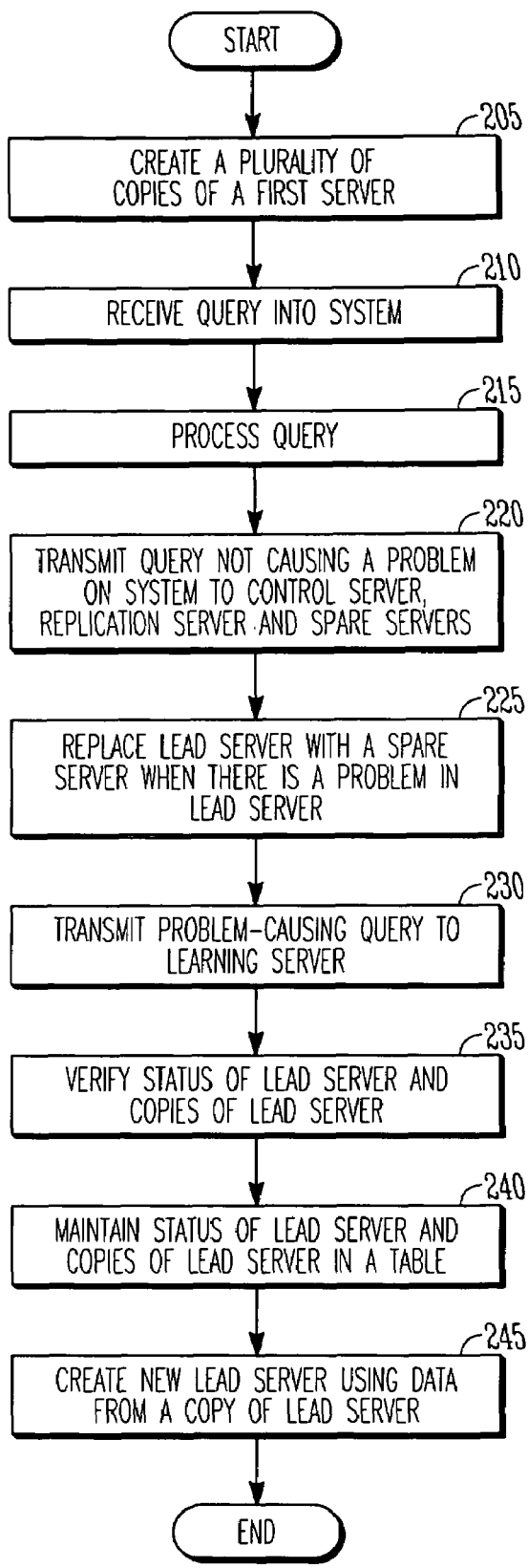
FIG. 2 illustrates an example embodiment of a method to protect a computer based service from corrupt data and/or queries.

FIG. 2 illustrates an example embodiment of a process 200 that may be implemented on the system 100 of FIG. 1 to implement computer service security. In FIG. 2, the system 100 is set up by the replication server 130 creating a plurality of copies 140A, 140B, 140C, and 140D of a lead server 110 at operation 205. These copies serve as spare servers (or backups) in the event that there is a problem with the lead server 110. Thereafter, a query is received from a user 115 into the system 100 at operation 210, and the lead server 110 processes that query at operation 215. If a query does not cause a problem in the lead server 110, the query is passed through the controller 120 and the replication server 130 onto the spare servers 140A, 140B, 140C, and 140D at operation 220. If a problem is detected by the controller 120 in the lead server 110, the replication server 130 causes one of the spare servers 140A, 140B, 140C, or 140D to replace the lead server 110 at operation 225. In this way, the system 100 can continue to process queries. In an embodiment, the replication server 130 creates a new lead server 110 from data from one of the plurality of copies of the lead server 110. The replication server 130 additionally transmits the query that caused the problem on the lead server 110 to be sent to a learning server 150 at operation 230. The learning server 150, in conjunction with one of the spare servers, tests and experiments with the query that caused the problem to determine if a reason that the query caused the problem can be determined, and further to determine if that problem can be prevented in the future.

In an embodiment, the determination that the lead server 110 has not had a problem with a particular query is performed by verifying that the lead server 110 is online. This may be performed in several ways. The controller 120 may verify that the lead server 110 is online by connecting to the lead server 110 and authenticating a password at operation 235. Additionally, each spare server 140A, 140B, 140C, and 140D that is created has a means of checking the integrity of the lead server 110. Furthermore, the replication server 130 may have separate threads that monitor the state of each of the lead server 110 and the spare servers 140A, 140B, 140C, and 140D. The replication server 130 may additionally poll each of the servers at periodic intervals, for example every 5 seconds or so, by logging into a server with a username and password specifically for testing whether the database is online. This polling and testing acts as a heartbeat mechanism and allows the replication server 130 to keep a table in memory on the state of all the servers that it is monitoring at operation 240.

The replication server 130 may be queried by any of the system components (e.g., controller, learner) for the state of any of the servers that it is monitoring. Through this mechanism, the replication server 130, or other system components, may query the number of servers (lead and spare) that are being monitored and not monitored. A spare server may not be monitored when it is under the control of the learning server 150 during experimentation with it. The replication server 130 may also create a new lead server 110 using data from one of the online spare servers (operation 245), create a new empty server with no data associated with the new server, delete a server, determine whether a server is a lead server or a spare server, replicate a query to all spare servers, swap the current lead server for one of the spare servers and promote the spare server to lead server, determine if a server is online, determine the TCP port that a server is monitoring, and send a problem-causing query to the learning server 150.

In an embodiment, when the controller 120 determines that a query has caused a problem in the lead server 110, the replication server 130 sends that problem-causing query to a learning server 150. The learning server 150 is intended to determine the underlying cause of the problem that the problematic query caused, and adjust the replication server 130 to recognize and discard future queries that exhibit the undesirable characteristics. Specifically, the learning server 150, in conjunction with a spare server, experiments on the query to determine the cause the problem, and to further determine if such problems could be prevented in the future. Any rules resulting from such experimentation may be passed from the learning server 150 to the controller 120, and the controller module 120 may modify its functionality accordingly. In one embodiment, the learning server 150 analyzes the problem-causing query to determine if it can identify any hex patterns, in addition to the hex patterns of the problem-causing query, that may cause a lead server 110 to experience problems. The learning server 150 does this by executing one or more test processes using one or more of the spare servers. These test processes are meant to imitate the lead server 110, so that if the test system has a problem with a generated query, it may be assumed that the lead server 110 also would have a problem with such a query. In an embodiment, the learning server 150 reads training data, experimenting on that data with the problem-causing query, and generating rules that may be applied to future queries. For example, a certain byte of the query may have caused the problem on the lead server 110. If that is the case, the learning server 150 may try different values for that byte in a test program to determine if these other values in that byte position also may cause a problem on the lead server 110. If other queries or data are found to be a potential problem by the learning server 150, rules are generated, and these rules may be applied to future queries received by the system 100. Thereafter, if the same query that caused a problem in this testing enters the system 100, that query can be identified by the lead server 110 and appropriate action may be taken.

In another example embodiment, a MySQL server version 3.23.49 is able to take advantage of a privilege escalation vulnerability in the binary API (Application Programmers Interface) that MySQL provides to the general public. Using the simple_command function provided in the API, one could pass as a parameter the option COM_TABLE_DUMP (which when used properly allows a table in a database to be deleted). This exploit takes advantage of a lack of bounds checking for this option. Consequently, any malformed parameters sent into the system will cause the server to overflow a buffer in memory and crash, thereby creating a denial-of-service (DOS). However, if this exploit were tried in the system 100, the lead server 110 would go offline. A controller 120 would then decide to switch to one of the backup servers (140A-140D) to allow servicing of queries to other clients that connect to the system. The controller 120 would then rebuild the fallen lead server 110 from a known uncorrupted backup (140A-140D). The system 100 provides both of these abilities and may do them in parallel to minimize downtime to client requests. The system 100 can guarantee that all of the backup servers are uncorrupted because of the a priori testing of each query on the lead server 110. If the query causes no problems to the lead server 110 it is then, and only then, copied to each of the backup servers (140A-140D) in the pool. The learning server 150 attempts to determine the reason(s) why the lead server 110 went offline, and creates a rule that will block future queries like this. Since the actual problem in this illustration was that an invalid buffer size was allocated in memory, the learning server 150 should come up with a generalized blocking rule with an interval of valid buffer sizes.

Figure 3:
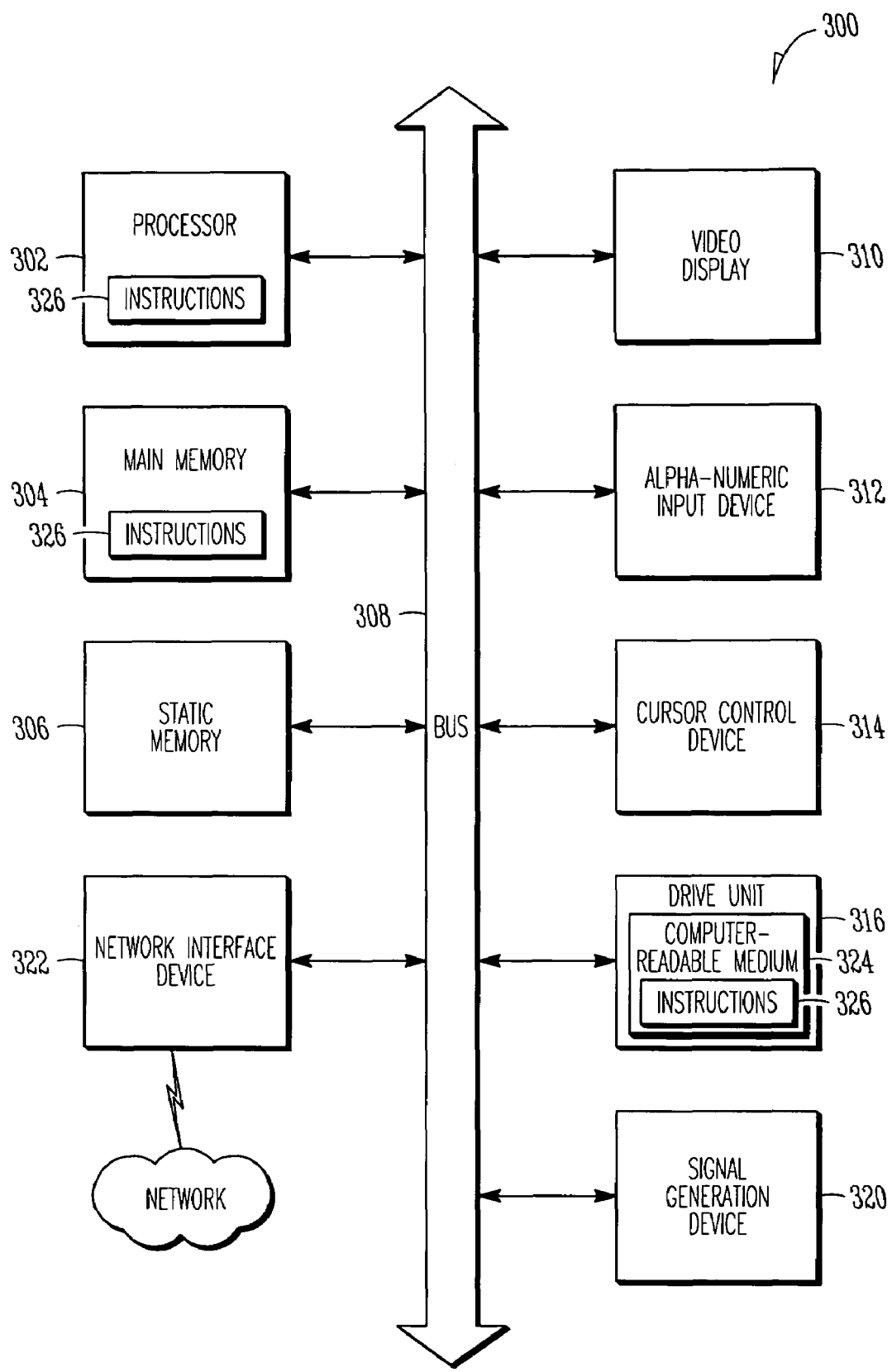
FIG. 3 illustrates an example embodiment of a computer system upon which an embodiment of the invention may operate.

FIG. 3 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g. a keyboard), a cursor control device 314 (e.g. a mouse), a disk drive unit 316, a signal generation device 320 (e.g. a speaker) and a network interface device 322.

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and modulated electromagnetic waves.

Thus, a system and method for computer service security has been described. Although the present invention has been described with reference to specific exemplary embodiments, it will be evident that various modifications and changes may be made to these embodiments without departing from the broader scope of the invention. Accordingly, the specification and drawings are to be regarded in an illustrative rather than a restrictive sense.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A method comprising:
   creating a plurality of copies of a first server in a system;
   receiving a communication into said system;
   processing said communication in said first server;
   transferring said communication to said plurality of copies of said first server when said communication did not cause a problem in said first server;
   transferring said communication to a learning server when said communication caused a problem in said first server; and
   replacing said first server with one of said plurality of copies of said first server when said communication caused a problem on said first server.

2. The method of claim 1, further comprising providing a replication server, wherein said replication server creates said plurality of copies of said first server.

3. The method of claim 1, further comprising:
   determining whether said first server is correctly operating by connecting to said first server and causing said first server to process data.

4. The method of claim 2, wherein said replication server comprises a plurality of threads, and further wherein one of said threads monitors the state of said first server and said plurality of copies of said first server.

5. The method of claim 2, wherein said replication server maintains a table of the states of said first server and said plurality of copies of said first server.

6. The method of claim 2, wherein said replication server creates additional servers using data from one of said plurality of copies of said first server.

7. The method of claim 1, wherein said learning server experiments with said communication that caused a problem on said first server.

8. A computer system comprising:
   a module that creates a plurality of copies of a first server in a system;
   a module that receives a communication into said system;
   a module that processes said communication in said first server;
   a module that transfers said communication to said plurality of copies of said first server when said communication did not cause a problem in said first server;
   a module that transfers said communication to a learning server when said communication caused a problem in said first server; and
   a module that replaces said first server with one of said plurality of copies of said first server when said communication caused a problem on said first server.

9. The computer system of claim 8, further comprising a replication server, wherein said replication server creates said plurality of copies of said first server.

10. The computer system of claim 8, further comprising a module to determine whether said first server is correctly operating by connecting to said first server and causing said first server to process data.

11. The computer system of claim 9, wherein said replication server comprises a plurality of threads, and further wherein one of said threads monitors the state of said first server and said plurality of copies of said first server.

12. The computer system of claim 9, wherein said replication server maintains a table of the states of said first server and said plurality of copies of said first server.

13. The computer system of claim 9, wherein said replication server creates additional servers using data from one of said plurality of copies of said first server.

14. The computer system of claim 8, wherein said learning server experiments with said communication that caused a problem on said first server.

15. A machine readable storage medium comprising instructions for executing a process comprising:
   creating a plurality of copies of a first server in a system;
   receiving a communication into said system;
   processing said communication in said first server;
   transferring said communication to said plurality of copies of said first server when said communication did not cause a problem in said first server;
   transferring said communication to a learning server when said communication caused a problem in said first server; and
   replacing said first server with one of said plurality of copies of said first server when said communication caused a problem on said first server.

16. The machine readable storage medium of claim 15, further comprising instructions for providing a replication server, wherein said replication server creates said plurality of copies of said first server.

17. The machine readable storage medium of claim 15, further comprising instructions for determining whether said first server is correctly operating by connecting to said first server and causing said server to process data.

18. The machine readable storage medium of claim 16, wherein said replication server comprises a plurality of threads, and further wherein one of said threads monitors the state of said first server and said plurality of copies of said first server.

19. The machine readable storage medium of claim 16, wherein said replication server maintains a table of the states of said first server and said plurality of copies of said first server.

20. The machine readable storage medium of claim 16, wherein said replication server creates additional servers using data from one of said plurality of copies of said first server; and further wherein said learning server experiments with said communication that caused a problem on said first server.

* * * * *